US009666161B2

(12) United States Patent
Zeng et al.

(10) Patent No.: US 9,666,161 B2
(45) Date of Patent: May 30, 2017

(54) METHOD AND SYSTEM FOR REPLACING THEME OF A MOBILE TERMINAL ON THE BASIS OF A USER'S CLOTHES COLOR

(71) Applicant: GUANG DONG OPPO MOBILE TELECOMMUNICATIONS CORP., LTD, Guangdong (CN)

(72) Inventors: Yuqing Zeng, Guangdong (CN); Yuanqing Zeng, Guangdong (CN)

(*) Notice: Subject to any disclaimer, the term of this patent is extended or adjusted under 35 U.S.C. 154(b) by 253 days.

(21) Appl. No.: 14/355,860

(22) PCT Filed: May 7, 2013

(86) PCT No.: PCT/CN2013/075240
§ 371 (c)(1),
(2) Date: May 2, 2014

(87) PCT Pub. No.: WO2014/075430
PCT Pub. Date: May 22, 2014

(65) Prior Publication Data
US 2016/0012796 A1    Jan. 14, 2016

(30) Foreign Application Priority Data

Nov. 19, 2012 (CN) .......................... 2012 1 0468135

(51) Int. Cl.
*G09G 5/02* (2006.01)
*H04M 1/725* (2006.01)
(Continued)

(52) U.S. Cl.
CPC ............ *G09G 5/02* (2013.01); *G06K 9/00228* (2013.01); *G06K 9/4652* (2013.01); *G06T 7/408* (2013.01);
(Continued)

(58) Field of Classification Search
CPC .......... G06T 7/004; G06T 2207/10024; G06K 9/4652
See application file for complete search history.

(56) References Cited

U.S. PATENT DOCUMENTS

2008/0232686 A1\* 9/2008 Ohashi ................ G06F 17/3025
382/168
2010/0182619 A1\* 7/2010 Kim ..................... H04N 1/6072
358/1.9
(Continued)

OTHER PUBLICATIONS

G. Jaffré and P. Joly. Improvement of a Person Labelling Method Using Extracted Knowledge on Costume. Computer Analysis of Images and Patterns, pp. 489-497, 2005.\*

*Primary Examiner* — Robert Craddock
(74) *Attorney, Agent, or Firm* — Prakash Nama; Global IP Services, PLLC

(57) ABSTRACT

A method and a system are provided for replacing the theme of a mobile terminal on the basis of a user's clothes color, including: setting an RGB value interval of clothes through analyzing the RGB values of all pixels of the clothes location in the obtained image and calculating the clothes RGB average, analyzing the RGB values of all pixels of every theme on a mobile terminal, calculating the theme RGB value average; when the theme RGB average is within the clothes RGB average interval, and replacing the theme of the mobile terminal by the theme corresponding to the theme RGB average. Thus, the mobile terminal becomes more interesting.

7 Claims, 2 Drawing Sheets

(51) Int. Cl.
  *G06K 9/46* (2006.01)
  *G06K 9/00* (2006.01)
  *G06T 7/40* (2017.01)
  *G06T 11/00* (2006.01)
  *H04N 1/60* (2006.01)

(52) U.S. Cl.
  CPC ....... *G06T 11/001* (2013.01); *H04M 1/72544* (2013.01); *H04N 1/6083* (2013.01); *G06T 2207/10024* (2013.01); *G06T 2207/30196* (2013.01); *H04N 2201/0089* (2013.01)

(56) References Cited

U.S. PATENT DOCUMENTS

| | | | |
|---|---|---|---|
| 2011/0150329 A1* | 6/2011 | Lepine | G06T 3/4038 382/165 |
| 2013/0085893 A1* | 4/2013 | Bhardwaj | G06Q 30/0643 705/26.62 |
| 2013/0127892 A1* | 5/2013 | Moore | G06T 11/001 345/582 |

* cited by examiner

METHOD AND SYSTEM FOR REPLACING THEME OF A MOBILE TERMINAL ON THE BASIS OF A USER'S CLOTHES COLOR

BACKGROUND OF THE INVENTION

The invention belongs to the field of theme setting and in particular relates to a method and a system for replacing the theme of a mobile terminal on the basis of a user's clothes color.

In the prior art, setting of mobile phone themes is as follows: a user enters a theme setting page to select a theme to replace the existing theme. The operation is complicated and boring, and hardly meets the demands of the user.

BRIEF SUMMARY OF THE INVENTION

The aim of the invention is to provide a method and a system for replacing the theme of a mobile terminal on the basis of a user's clothes color. The invention replaces the current theme of the mobile terminal on the basis of the clothes color of the user, thus solving the abovementioned problems.

The invention is as follows. A method for replacing the theme of a mobile terminal on the basis of a user's clothes color is provided, comprising the following steps:

acquiring the image of a user in front of the mobile terminal;

acquiring the clothes location of the user in the image;

analyzing the clothes RGB value corresponding to every pixel at the clothes location;

calculating the clothes RGB average of the clothes RGB values corresponding to all pixels;

setting a clothes RGB average interval on the basis of the obtained clothes RGB average;

analyzing the theme RGB values corresponding to all pixels on every theme in the mobile terminal;

calculating the theme RGB average of the theme RGB values corresponding to all pixels;

detecting if the theme RGB average is within the clothes RGB average interval; and when the theme RGB average is within the clothes RGB average interval, replacing the theme of the mobile terminal by the theme corresponding to the theme RGB average.

The other aim of the embodiment of the invention is to provide a system for replacing the theme of a mobile terminal on the basis of a user's clothes color. The system comprises:

a first acquisition module for acquiring the image of a user in front of the mobile terminal;

a second acquisition module for acquiring the clothes location of the user in the image;

an analysis module for analyzing the clothes RGB value corresponding to every pixel at the clothes location;

a first calculation module for calculating the clothes RGB average of the clothes RGB values corresponding to all pixels;

a setting module for setting a clothes RGB average interval on the basis of the obtained clothes RGB average;

an analysis module for analyzing the theme RGB values corresponding to all pixels on every theme in the mobile terminal;

a second calculation module for calculating the theme RGB average of the theme RGB values corresponding to all pixels;

a detection module for detecting if the theme RGB average is within the clothes RGB average interval; and a replacement module for replacing the theme of the mobile terminal by the theme corresponding to the theme RGB average when the theme RGB average is within the clothes RGB average interval.

The embodiment of the invention provides a method and a system for replacing the theme of a mobile terminal on the basis of a user's clothes color. The method comprises: setting an RGB value interval of clothes through analyzing RGB values of all pixels of the clothes location in the obtained image and calculating the clothes RGB average, analyzing the RGB values of all pixels of every theme on a mobile terminal, calculating the theme RGB value average; when the theme RGB average is within the clothes RGB average interval, and replacing the theme of the mobile terminal by the theme corresponding to the theme RGB average. Thus, the mobile terminal becomes more interesting.

DETAILED DESCRIPTION OF THE INVENTION

To clarify the objectives, technical solutions and advantages of the invention, the invention is described in further detail with reference to the attached drawings. It should be understood that the embodiments described in detail are only used for explaining the invention and not used for limiting invention.

Figure 1:
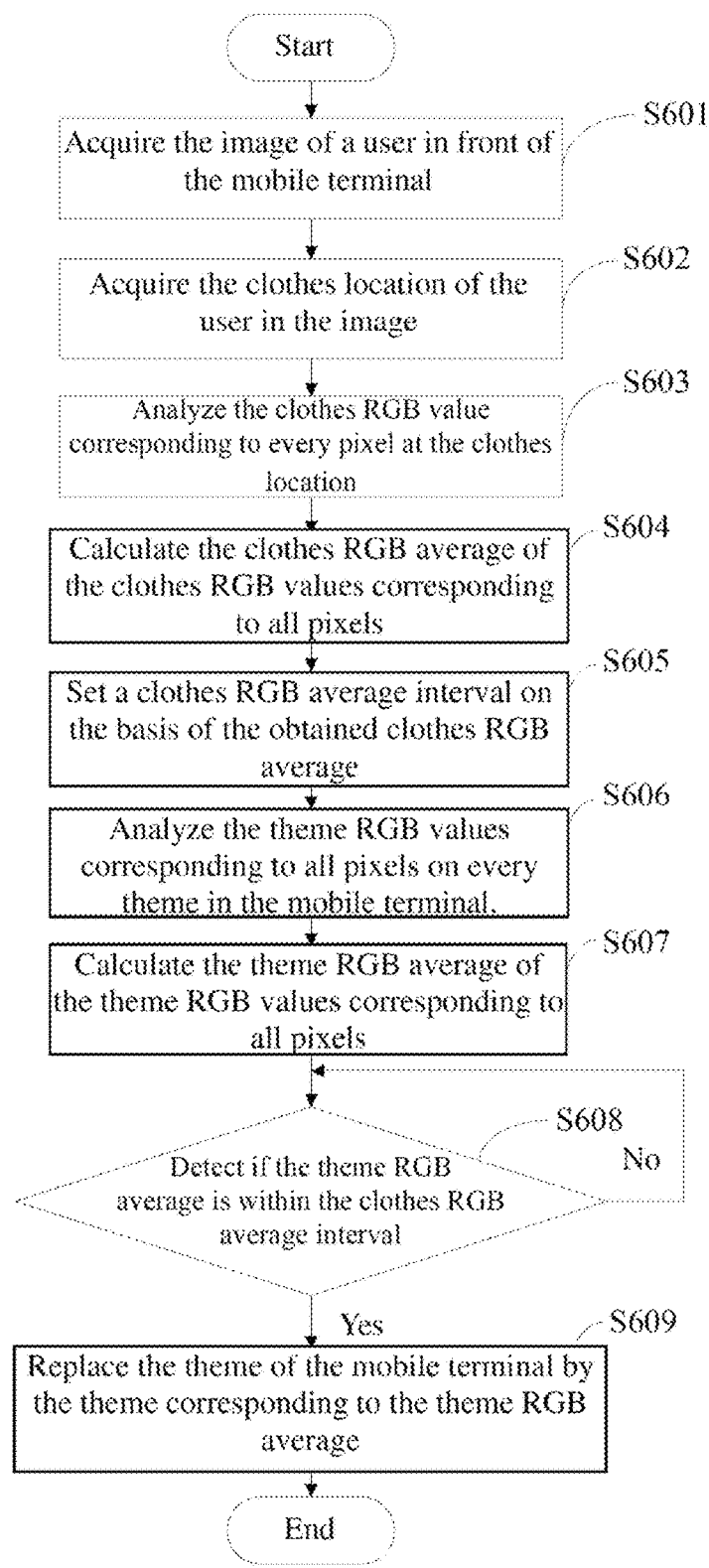
FIG. 1 is the flowchart of a method provided by the embodiment of the invention for replacing the theme of a mobile terminal on the basis of a user's clothes color.

See FIG. 1 for one embodiment of the invention. FIG. 1 shows the flowchart of a method provided by this embodiment of the invention for replacing the theme of a mobile terminal on the basis of a user's clothes color. The method specifically comprises the following steps:

Step S601, acquire the image of a user in front of the mobile terminal.

Step S602, acquire the clothes location of the user in the image. In this embodiment, the step of acquiring the clothes location of the user in the image specifically comprises: recognizing the location of the human face in the image, and determining the clothes location on the basis of the location of the human face and a preset height ratio. For example, if the current preset height ratio is 2:3, after the location of the human face is recognized, the user can obtain the location of the upper body of the user, namely the clothes location, according to the preset height ratio.

Step S603, analyze the clothes RGB value corresponding to every pixel at the clothes location.

Step S604, calculate the clothes RGB average of the clothes RGB values corresponding to all pixels.

Step S605, set a clothes RGB average interval on the basis of the obtained clothes RGB average. In this embodiment, the step of setting a clothes RGB average interval on the basis of the obtained average RGB values specifically is: adding a preset tolerance to the clothes RGB average and then setting the clothes RGB average interval.

Step S606, analyze the theme RGB values corresponding to all pixels on every theme in the mobile terminal.

Step S607, calculate the theme RGB average of the theme RGB values corresponding to all pixels.

Step S608, detect if the theme RGB average is within the clothes RGB average interval.

Step S609, when the theme RGB average is within the clothes RGB average interval, replace the theme of the mobile terminal by the theme corresponding to the theme RGB average.

Furthermore, after step S607, the method also comprises: calculating the clothes RGB variance of the clothes RGB values corresponding to all pixels; setting a clothes RGB variance interval on the basis of the obtained clothes RGB variance; calculating the theme RGB variance of the theme RGB values corresponding to all pixels of each theme; detecting if the theme RGB average is within the clothes RGB average interval and if the theme RGB variance is within the clothes RGB variance interval; and, when the theme RGB average is within the clothes RGB value interval and the theme RGB variance is within the clothes RGB variance interval, replacing the theme of the mobile terminal by the theme corresponding to the theme RGB variance. In this embodiment, the step of setting a clothes RGB variance interval on the basis of the obtained clothes RGB variance specifically is: adding a preset tolerance to the clothes RGB variance and then setting the clothes RGB variance interval.

In this embodiment, when the theme RGB average of many themes are within the clothes RGB value interval and the theme RGB variances within the clothes RGB variance interval, one theme is randomly selected from many themes and the selected theme is used as the current theme of the mobile terminal.

Those ordinarily skilled in this field can understand that all or part of the steps for realizing the method in the above embodiment can be accomplished by the related hardware under the direction of the program. The program can be stored in a computer readable memory media which may be a ROM/RAM, a disc or an optical disc, etc.

Figure 2:
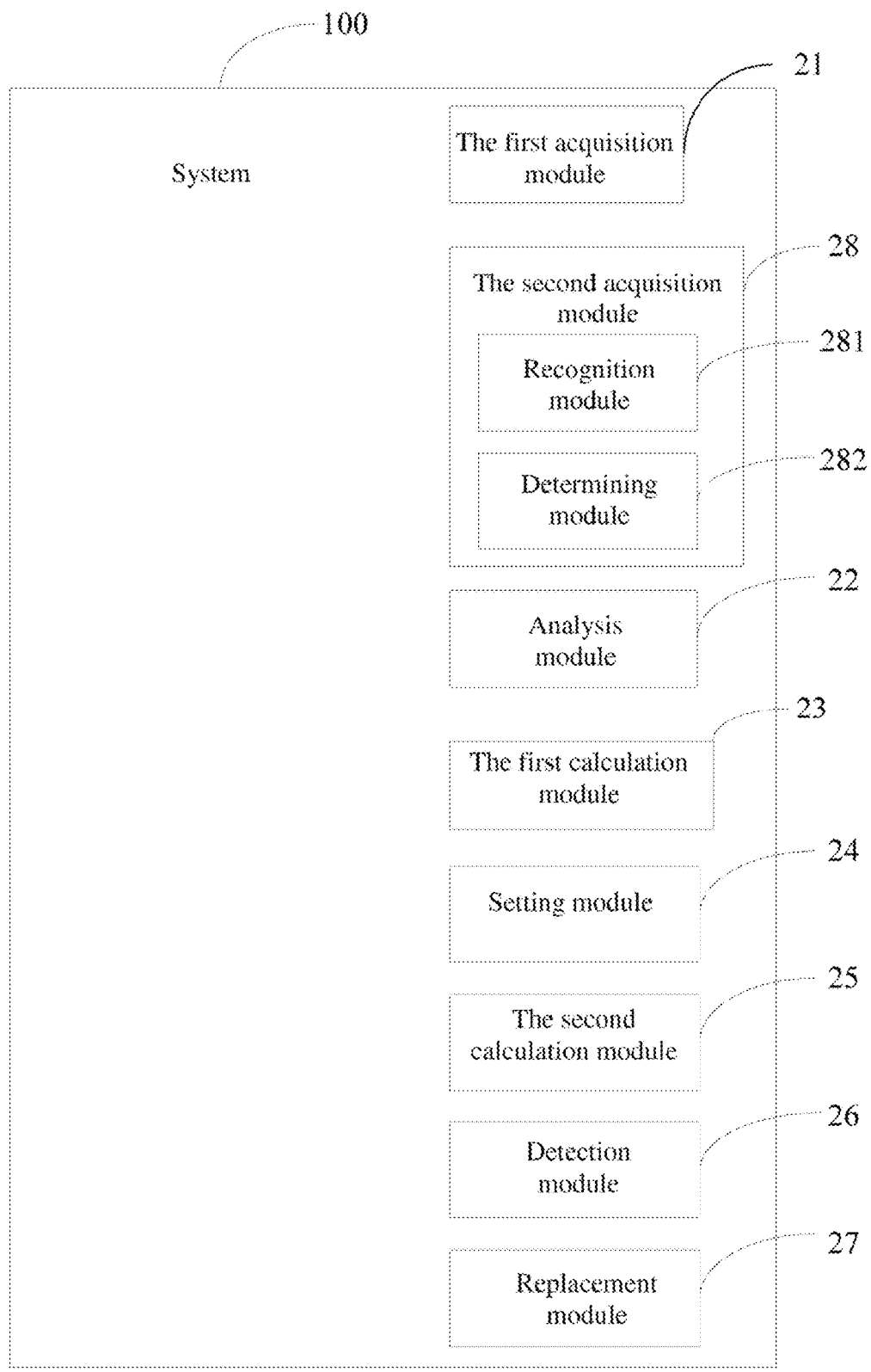
FIG. 2 is the module structural view of a system provided by the embodiment of the invention for replacing the theme of a mobile terminal on the basis of a user's clothes color.

FIG. 2 is the module structural view of a system 100 provided by the embodiment of the invention for replacing the theme of a mobile terminal on the basis of a user's clothes color. In this embodiment of the invention, the system 100 comprises a first acquisition module 21, a second acquisition module 28, an analysis module 22, a first calculation module 23, a setting module 24, a second calculation module 25, a detection module 26 and a replacement module 27.

The first acquisition module 21 is used for acquiring the image of a user in front of the mobile terminal. In this embodiment, the first acquisition module 21 is a front camera. The second acquisition module 28 is used for acquiring the clothes location of the user in the image. The analysis module 22 is used for analyzing the clothes RGB value corresponding to every pixel at the clothes location. The first calculation module 23 is used for calculating the clothes RGB average of the clothes RGB values corresponding to all pixels. The setting module 24 is used for setting the clothes RGB average interval on the basis of the obtained clothes RGB average. In this embedment, the setting module 24 sets the clothes RGB average interval through adding a preset tolerance to the clothes RGB average. The analysis module 22 is used for analyzing the theme RGB values corresponding to all pixels on every theme in the mobile terminal. The second calculation module 25 is also used for calculating the theme RGB average of the theme RGB values corresponding to all pixels. The detection module 26 is used for detecting if the theme RGB average is within the clothes RGB average interval. The replacement module 27 is used for replacing the theme of the mobile terminal by the theme corresponding to the theme RGB average when the theme RGB value average is within the clothes RGB average interval.

In another embodiment, the first calculation module 23 is also used for calculating the clothes RGB variance of the clothes RGB values corresponding to all pixels. The setting module 24 is also used for setting a clothes RGB variance interval on the basis of the obtained clothes RGB variance. In this embodiment, the setting module 24 sets the clothes RGB variance interval through adding a preset tolerance to the clothes RGB variance. The second calculation module 25 is also used for calculating the theme RGB variance of the theme RGB values corresponding to all pixels of each theme. The detection module 26 is also used for detecting if the theme RGB average is within the clothes RGB average interval and if the theme RGB variance is within the clothes RGB variance interval. The replacement module 27 is also used for replacing the theme of the mobile terminal by the theme corresponding to the theme RGB variance when the theme RGB average is within the clothes RGB value interval and the theme RGB variance is within the clothes RGB variance interval.

In this embodiment, the replacement module 27 is also used for selecting one from many themes randomly and using the selected theme as the current theme of the mobile terminal when the theme RGB average of many themes are within the clothes RGB value interval and the theme RGB variances within the clothes RGB variance interval.

In this embodiment, the second acquisition 28 comprises a recognition module 281 and a determining module 282. The recognition module 281 is used for recognizing the location of the human face in the image. The determining module 282 is used for determining the clothes location on the basis of the location of the human face and a preset height ratio.

The invention provides a method and a system for replacing the theme of a mobile terminal on the basis of a user's clothes color. The invention comprises: setting an RGB value interval of clothes through analyzing RGB values of all pixels of the clothes location in the obtained image and calculating the clothes RGB average, analyzing the RGB values of all pixels of every theme on a mobile terminal, calculating the theme RGB value average; when the theme RGB value average is within the clothes RGB average interval, and replacing the theme of the mobile terminal by the theme corresponding to the theme RGB average. Thus, the mobile terminal becomes more interesting.

The above descriptions are just preferable embodiments of this invention, which cannot be used as limit on this invention. Within the spirit and principle of this invention, any modification, equivalent substitution or improvement all shall be included in the protective scope of this invention.

What is claimed is:

1. A method for replacing the theme of a mobile terminal on the basis of a user's clothes color, characterized in that the method comprises the following steps:
    acquiring the image of a user in front of the mobile terminal;
    acquiring the clothes location of the user in the image;
    analyzing the clothes RGB value corresponding to every pixel at the clothes location;
    calculating the clothes RGB average of the clothes RGB values corresponding to all pixels;
    setting a clothes RGB average interval on the basis of the obtained clothes RGB average;
    analyzing the theme RGB values corresponding to all pixels on every theme in the mobile terminal;

calculating the theme RGB average of the theme RGB values corresponding to all pixels;

detecting if the theme RGB average is within the clothes RGB average interval; and when the theme RGB average is within the clothes RGB average interval, replacing the theme of the mobile terminal by the theme corresponding to the theme RGB average;

wherein acquiring the clothes location of the user in the image comprises:

recognizing the location of the human face in the image; and determining the clothes location on the basis of the location of the human face and a preset height ratio; and whereinafter calculating the theme RGB average of the theme RGB values corresponding to all pixels, the method also comprises:

calculating the clothes RGB variance of the clothes RGB values corresponding to all pixels;

setting a clothes RGB variance interval on the basis of the obtained clothes RGB variance;

calculating the theme RGB variance of the theme RGB values corresponding to all pixels of each theme;

detecting if the theme RGB average is within the clothes RGB average interval and if the theme RGB variance is within the clothes RGB variance interval; and, when the theme RGB average is within the clothes RGB value interval and the theme RGB variance is within the clothes RGB variance interval, replacing the theme of the mobile terminal by the theme corresponding to the theme RGB variance.

2. The method for replacing the theme of a mobile terminal on the basis of a user's clothes color according to claim 1, characterized in that the step of setting a clothes RGB average interval on the basis of the obtained average clothes RGB values specifically is:

adding a preset tolerance to the clothes RGB average and then setting the clothes RGB average interval.

3. The method for replacing the theme of a mobile terminal on the basis of a user's clothes color according to claim 1, characterized in that the step of setting a clothes RGB variance interval on the basis of the obtain clothes RGB variance specifically is:

adding a preset tolerance to the clothes RGB variance and then setting the clothes RGB variance interval.

4. The method for replacing the theme of a mobile terminal on the basis of a user's clothes color according to claim 1, characterized in that after the step of detecting if the average theme RGB value is within the clothes RGB value interval and the theme RGB variance is within the clothes RGB variance interval, the method also comprises:

when the theme RGB average of many themes is within the clothes RGB value interval and the theme RGB variances are within the clothes RGB variance interval, selecting one from many themes randomly and using the selected theme as the current theme of the mobile terminal.

5. A method for replacing the theme of a mobile terminal on the basis of a user's clothes color, comprising:

acquiring the image of a user in front of the mobile terminal;

acquiring the clothes location of the user in the image;

analyzing the clothes RGB value corresponding to every pixel at the clothes location;

calculating the clothes RGB average of the clothes RGB values corresponding to all pixels;

setting a clothes RGB average interval on the basis of the obtained clothes RGB average;

analyzing the theme RGB values corresponding to all pixels on every theme in the mobile terminal;

calculating the theme RGB average of the theme RGB values corresponding to all pixels;

calculating the clothes RGB variance of the clothes RGB values corresponding to all pixels;

setting a clothes RGB variance interval on the basis of the obtained clothes RGB variance;

calculating the theme RGB variance of the theme RGB values corresponding to all pixels of each theme;

detecting if the theme RGB average is within the clothes RGB average interval and if the theme RGB variance is within the clothes RGB variance interval; and when the theme RGB average is within the clothes RGB value interval and the theme RGB variance is within the clothes RGB variance interval, replacing the theme of the mobile terminal by the theme corresponding to the theme RGB variance.

6. The method for replacing the theme of a mobile terminal on the basis of a user's clothes color according to claim 5, wherein setting the clothes RGB variance interval on the basis of the obtained clothes RGB variance comprises:

adding a preset tolerance to the clothes RGB variance and then setting the clothes RGB variance interval.

7. The method for replacing the theme of a mobile terminal on the basis of as user's clothes color according to claim 5, wherein after defecting if the average theme RGB value is within the clothes RGB value interval and the theme RGB variance is within the clothes RGB variance interval, further comprises:

when the theme RGB average of many themes is within the clothes RGB value interval and the theme RUB variances are within the clothes RGB variance interval, selecting one from many themes randomly and using the selected theme as the current theme of the mobile terminal.

* * * * *